April 2, 1940.  J. A. BAKER  2,195,805
AMUSEMENT DEVICE
Filed May 24, 1938      5 Sheets-Sheet 1

INVENTOR.
John A. Baker
BY Mock & Blum
ATTORNEYS

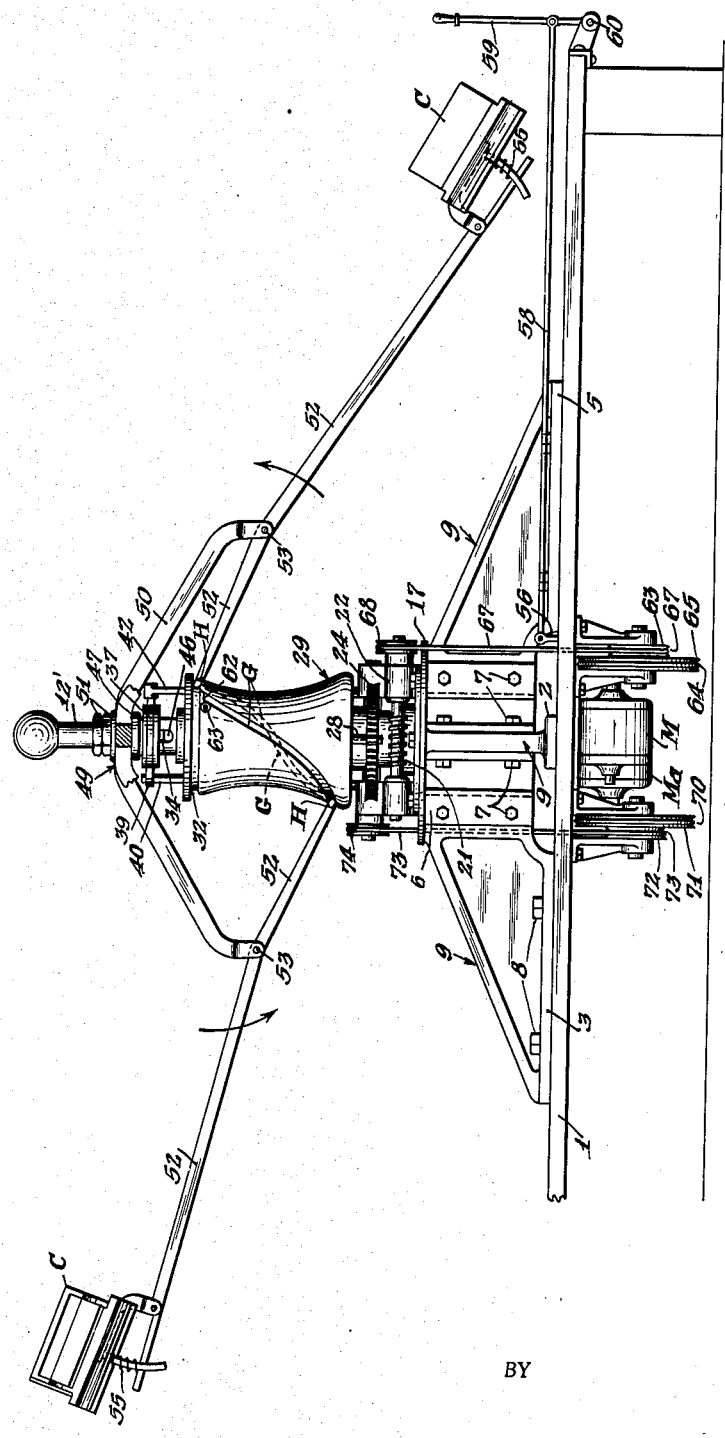

April 2, 1940. J. A. BAKER 2,195,805
AMUSEMENT DEVICE
Filed May 24, 1938 5 Sheets-Sheet 3
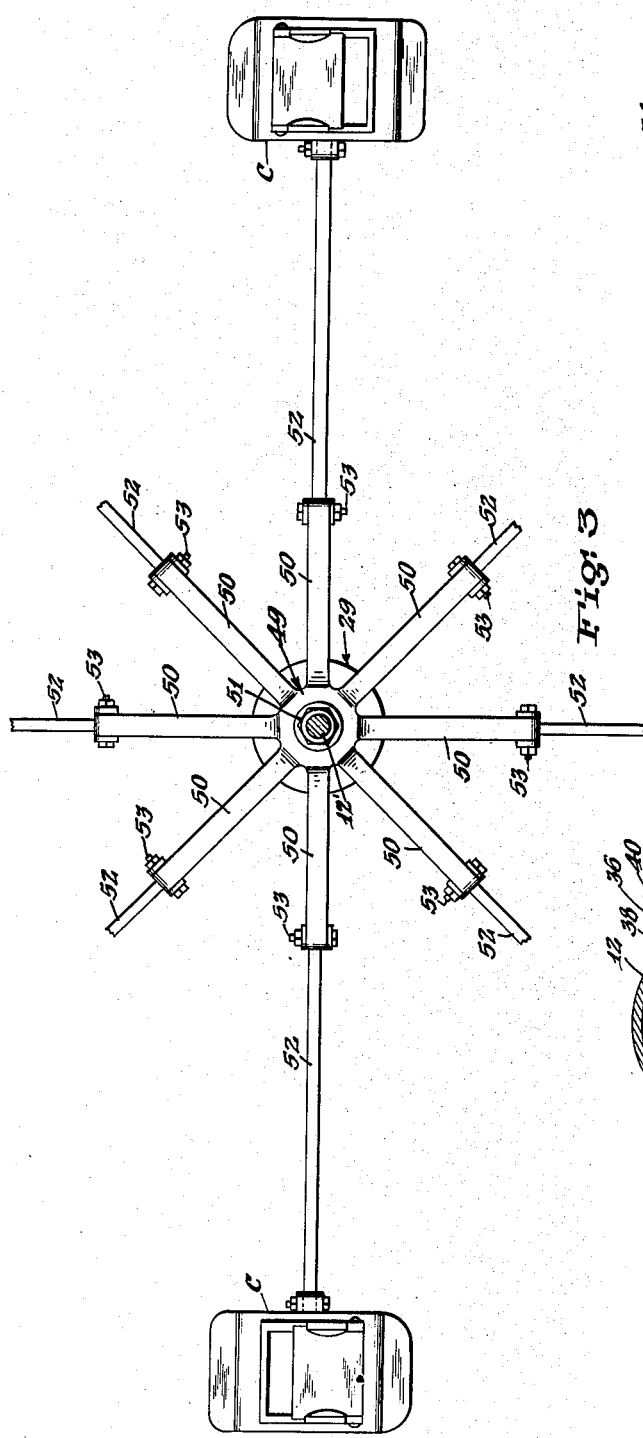
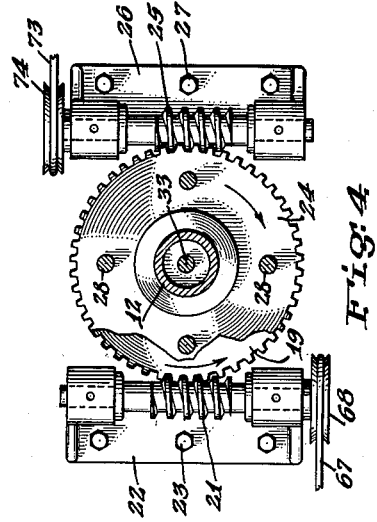
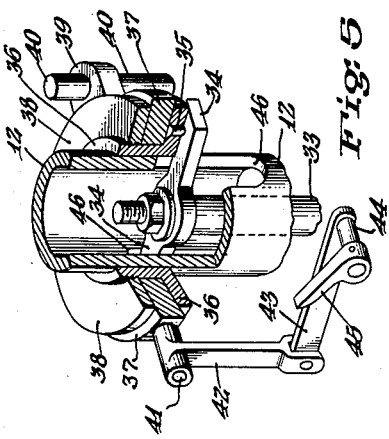
INVENTOR.
John A. Baker
BY Mock + Blum
ATTORNEYS

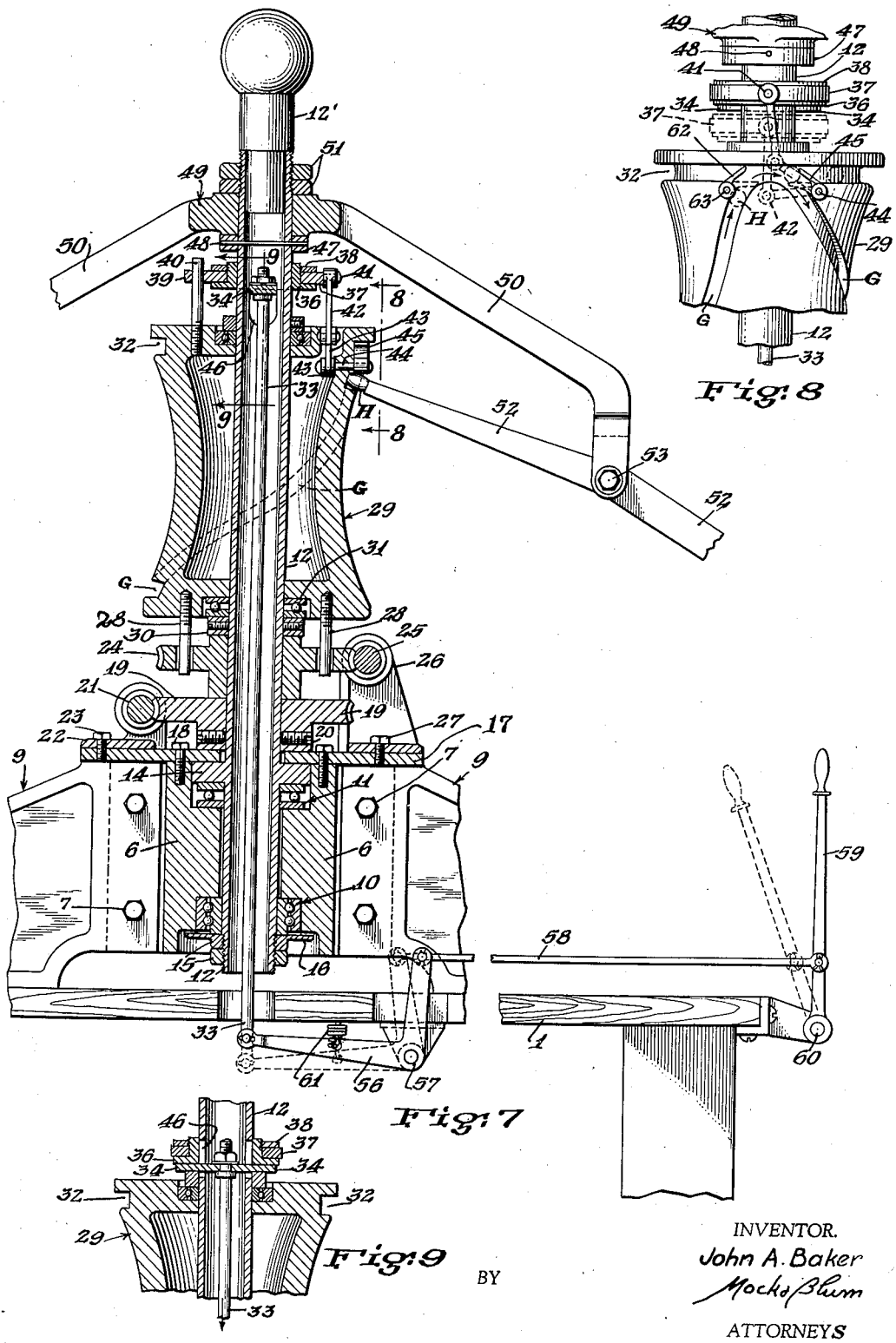

Patented Apr. 2, 1940

2,195,805

UNITED STATES PATENT OFFICE 2,195,805

AMUSEMENT DEVICE

John A. Baker, Long Beach, Calif.

Application May 24, 1938, Serial No. 209,680

2 Claims. (Cl. 272—36)

My invention relates to a new and improved amusement apparatus.

One of the objects of the invention is to produce apparatus whereby a series of cars, in which passengers can be seated, are moved in a curved path around a common axis, said cars being given up and down movements while moving in said closed curved path so as to simulate a ride in an aeroplane.

Another object of the invention is to provide a simple and rugged apparatus in which all the cars will be brought to their normal lowest level, before the turning movement of the apparatus is stopped, so that the passengers can easily get into the cars and out of the cars, when the apparatus is stationary.

Other objects of the invention are to provide an apparatus of this kind which shall be of simple and rugged construction and which can be easily operated and repaired.

Other objects of the invention will be set forth in the following description and drawings which illustrate a preferred embodiment thereof, it being understood that the above statement of the objects of my invention is intended generally to explain the same without limiting it in any manner.

Fig. 2 is a side elevation taken in a plane at the left-hand side of Fig. 1, and in a plane perpendicular to the plane of Fig. 1.

Fig. 3 is a plan view on the line 3—3 of Fig. 1.

Fig. 4 is a sectional view on the line 4—4 of Fig. 1.

Fig. 5 is a diagrammatic perspective view showing the manually controlled apparatus whereby the apparatus can be regulated so that all the cars will be brought to their lowest level before the turning movement of the apparatus is stopped. The cars will thereupon remain at said lowest level, which is shown in broken lines in Fig. 1, while the apparatus continues to turn and when the apparatus stops moving.

Figure 1:
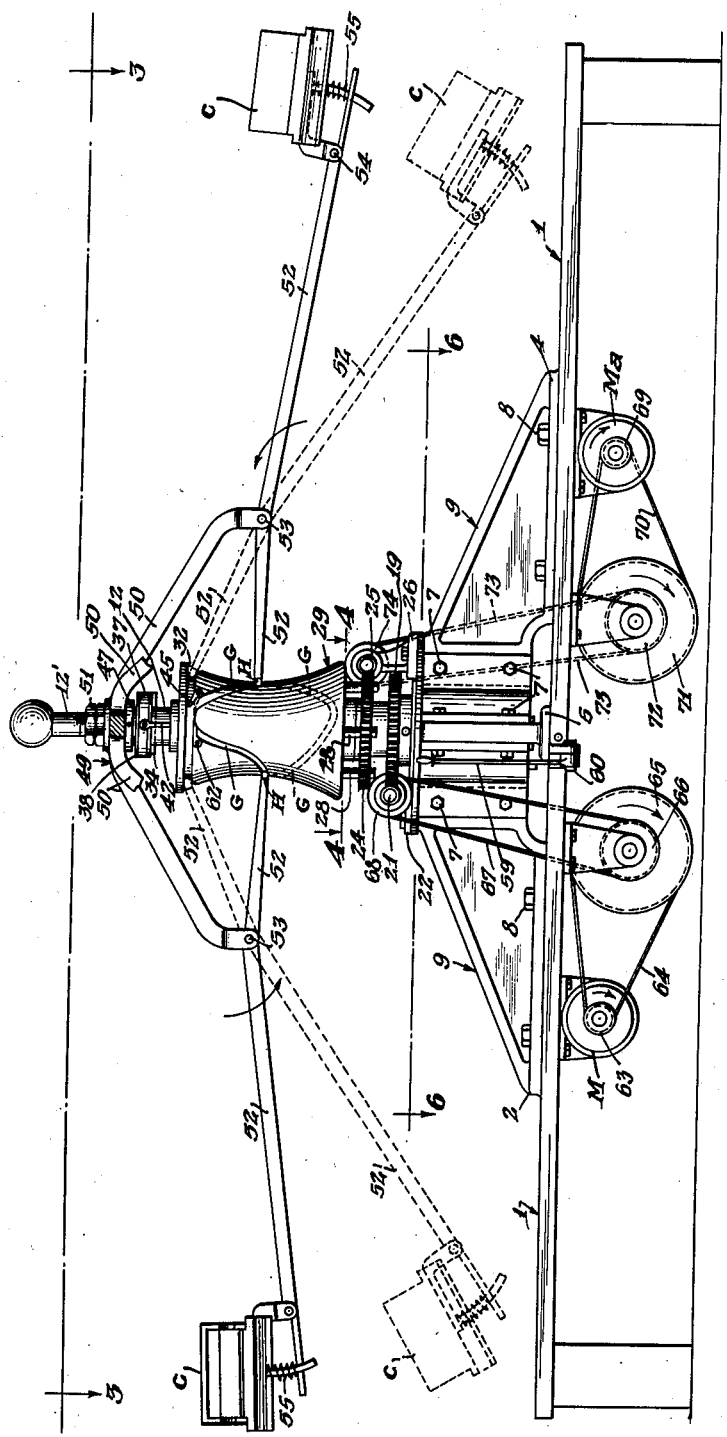
Fig. 1 is a side elevation showing the improved device.
Figure 6:
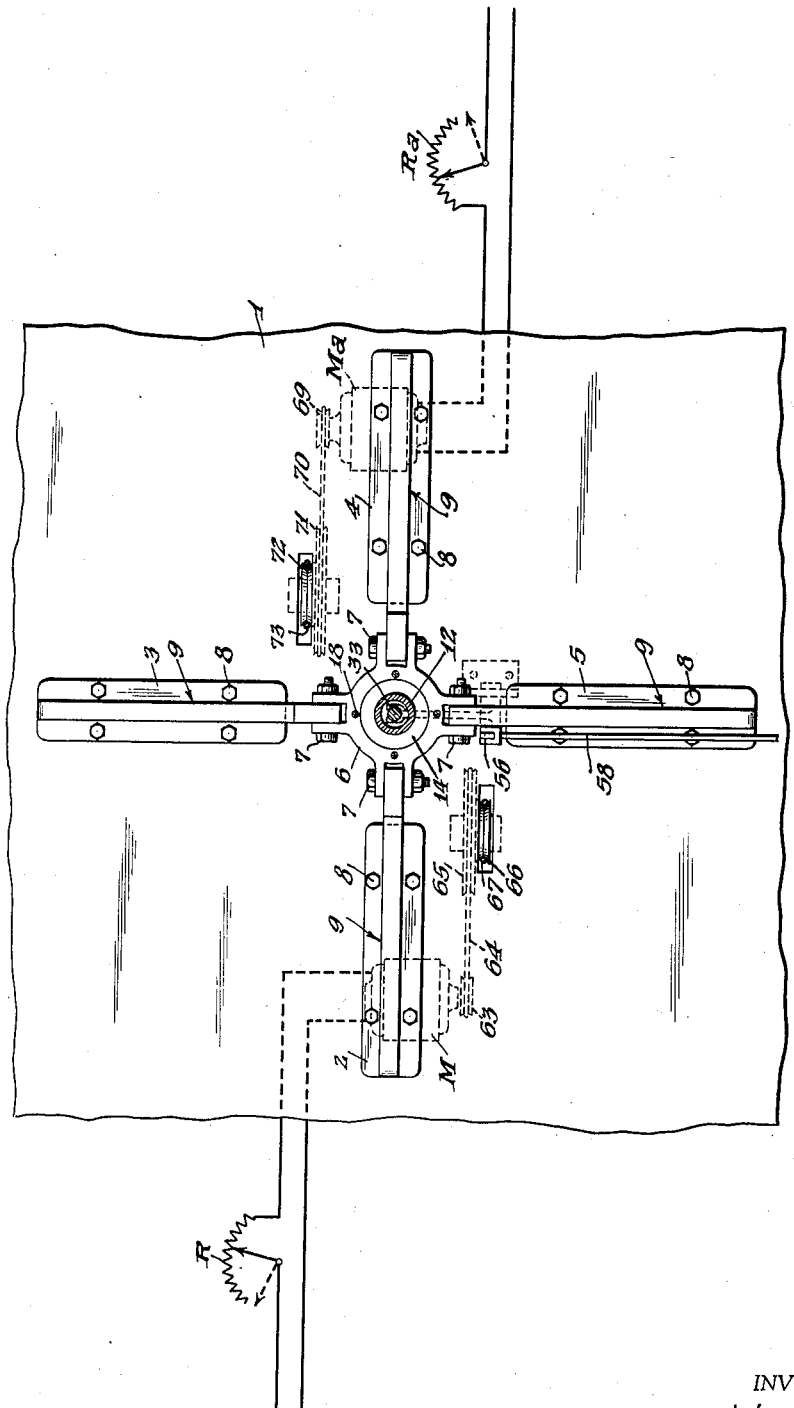

Fig. 6 is a sectional view on the line 6—6 of Fig. 1.

Fig. 7 is an enlarged vertical cross-section through the central part of the apparatus.

Figs. 8 and 9 are respectively sectional views on the lines 8—8 and 9—9 of Fig. 7.

The apparatus embodies a suitable base or platform 1. As shown in Fig. 6, four frames 2, 3, 4 and 5 are mounted on platform 1. These frames radiate from a common center. A bearing member 6, which may be a suitable casting and of relatively small height, is connected to the flanges 9 of the respective frames 2—5 by means of bolts 7. The frames 2—5 are connected to the platform 1 by means of suitable bolts 8. These frames have upstanding solid flanges 9 which are integral with the bases of said frames, and said flanges 9 are of general triangular shape in side elevation, and they are T-shaped in cross section in a plane perpendicular to the plane of Fig. 1.

As shown in Fig. 7, the bearing member 6 is provided with a lower radial anti-friction bearing 10 and an upper end-thrust anti-friction bearing 11. A shaft 12 is turnably located within the bearing column 6. Said shaft 12 has a cap 12'. The turnable shaft 12 is provided with a flange 14 against which one of the races of the anti-friction bearing 11 abuts. The shaft 12 is held in longitudinal position relative to bearing member 6, by means of nuts 15 and a washer 16.

A cover 17 is provided at the top of the bearing member 6 and this cover 17 is connected by means of screws 18 to said bearing member 6. A lower worm gear 19 is connected by means of set screws 20 which pass through the hub of said worm gear to the shaft 12, so that the worm gear 19 and the shaft 12 turn in unison.

The lower worm gear 19 meshes with the worm 21. The shaft of the worm 21 is turnably connected to a casting 22, which is connected to the cover 17 by means of bolts 23.

An upper worm gear 24 is mounted freely upon the shaft 12, so that shaft 12 and gear 24 can turn relative to each other. The bottom edge of the upper worm gear 24 rests on top of the worm gear 19. Upper worm gear 24 can turn freely relative to lower worm gear 19. The upper worm gear 24 meshes with a worm 25 whose shaft is journalled in a casting 26 which is connected by means of bolts 27 to the cover 17. The worm gear 24 has vertical openings through which pins 28 extend. The upper ends of said pins 28 are screwed into the bottom face of cam drum 29. The cam drum 29 is supported upon a collar 30 which is rigidly fastened to the shaft 12.

An anti-friction bearing 31 is provided between the collar 30 and the bottom of the cam drum 29. The cam drum 29 is free to turn relative to the shaft 12. The cam drum 29 is hollow and its wall is provided with a groove G whose preferred shape is clearly shown in Figs. 1, 2 and 7. This groove G may be of any shape.

In Figs. 1 and 2, the broken-line part of the groove G indicates that part of said groove which is at the back, in the respective figure. This groove G is preferably continuous. Any type of cam drum can be used.

The cam drum 29 is also provided with a continuous horizontal groove 32. A part of the cam groove G intersects a part of the horizontal groove 32, as shown in Fig. 8. A vertical rod 33 is located within the hollow shaft 12. At its upper end, and as shown in Fig. 5, a diametral arm 34 is turnably connected to said rod 33.

As shown in Fig. 5, the diametral arm 34 is connected at each of its ends by a rivet 35 to the base of a collar 36.

The collar 36 is turnable relative to the hollow shaft 12. A ring 37 is mounted on the base of the collar 36. Ring 37 is prevented from moving upwardly by means of a nut washer 38, which is threaded upon the respective adjacent part of the collar 36. Said ring 37 is turnable relative to collar 36. The ring 37 is provided with a projecting lug 39, which has a vertical pin 40 which extends through a vertical bore in said lug 39. Said pin 40 is threaded into the top wall of the drum 29. Hence, arm 34 and collar 36 turn in unison with shaft 12, and ring 37 turns in unison with drum 29. Ring 37 can move up and down relative to pin 40. The ring 37 is also provided with a horizontal pivot pin 41 on which an arm 42 is turnably mounted.

A link 43 is pivotally connected to the bottom forked end of the arm 42. A pivot pin 44 is fixedly connected to the link 43 and this pin 44 is turnably connected to the cam drum 29, as shown in Fig. 8.

A latch 45 is connected to the turnable pin 44. As shown in broken lines in Fig. 8, the member 45 can be located so that it does not extend above the bottom wall and the horizontal groove 32. In said position, latch 45 does not obstruct the movement of the heads H of pivoted arm 52 in the horizontal groove 32. Since latch 45 is connected to ring 37 by the parts shown in Fig. 5, the position of pin 44 relative to drum 29 is the position shown in Fig. 8.

When member 45 is in the full line position shown in Fig. 8, it prevents the movement of heads H in the groove 32.

As shown in Fig. 5, the hollow shaft 12 is provided with vertical slots 46, so as to permit the upward and downward movement of the branches of the diametral arm 34, in unison with the vertical movement of rod 33. Said arm 34 fits fairly snugly in the slots 46 so that the arm 34 turns in unison with the shaft 12. The arm 34 is turnably mounted adjacent the top of the rod 33, so that the rod 33 does not turn, and it moves only up and down.

A collar 47 is connected to the shaft 12, by means of a cross pin 48. A spider 49, having rigid arms 50, is supported upon the collar 47, and said spider 49 is held on shaft 12 by means of lock nuts 51 which are threaded upon the shaft 12. Arms 52 are pivotally connected at 53 to the arms 50 of the spider 49. The inner ends of said arms 52 have roller heads H which enter the cam groove G.

The cars C are located at the outer ends of the arms 52. Each car C is provided with an arm which is pivotally connected at 54 to the respectively turnable spider arm 52. A compression spring 55, mounted upon a suitable curved core yieldably holds the car C relative to the arm 52 in the normal position shown in full lines in Fig. 1. However, the car C can rock around the pivot 54.

The rod 33 is pivotally connected at its lower end to a bell crank 56, which is pivotally connected at 57 to a depending lug of the platform 1. The bell crank 56 is connected by means of a link 58 to a lever 59, which is pivotally mounted at 60 to an extension of the platform 1. A tension spring 61 normally keeps the rod 33 in the upper full-line position shown in Fig. 7. When the rod 33 is in its upper position, the latch 45 is in the full line position shown in Fig. 8. When the operator turns the lever 59 from the full-line position shown in Fig. 7, to the broken line position illustrated therein, the rod 33 is moved to its lower broken-line position shown in Fig. 7 and the latch 45 drops into the broken-line position shown in Fig. 8. The cam drum 29 is also provided with a supplemental gravity operated latch 62, which is pivotally mounted at 63 to said drum.

When latch 62 assumes the horizontal broken-line position shown in Fig. 8, the free end of said latch normally rests on the lower side wall of groove G at that point where said wall is in a nearly horizontal position. Fig. 1 clearly shows this.

As shown in Fig. 1, a motor M is connected to the underside of the platform 1, and its shaft is provided with a pulley 63 which is connected by belt 64 to a larger pulley 65. The shaft of the pulley 65 has a pulley 66 which is smaller than pulley 65 and which is connected by belt 67 to a pulley 68 which is located on the shaft of the worm 21, thus turning the lower worm gear 19 and the hollow shaft 12. Any suitable speed-reduction mechanism can be used for driving shaft 12.

An auxiliary motor Ma has its shaft provided with a pulley 69 which is connected by means of belts 70 to a larger pulley 71. The shaft of pulley 71 has a pulley 72, whose belt 73 drives the pulley 74 of the worm 25.

The worm 25 thus turns the drum 29 in a direction opposite to the turning movement of the shaft 12. However, the invention is not limited to turning the drum 29 in a direction opposite to that of the shaft 12. That is, members 29 and 12 could turn in the same direction if member 29 turns faster than member 12, or if there is any difference in their turning speeds.

The motors M and Ma are provided with governing rheostats R and Ra.

While the shaft 12 is turned to operate the device, the lever 59 is normally maintained in the full-line position shown in Fig. 7, so that the latch 45 is held in the full-line position shown in Fig. 8.

The roller heads H are therefore moved up and down by the cam groove G, thus rocking each arm 52 about a horizontal axis and raising and lowering the respective cars C, while the spider is turned, so that the cars are moved in a path having a circular projection in a horizontal plane. The latch 45 will prevent the heads H from entering the groove 32 and from moving horizontally in said groove 32. The gravity latch 62 will be raised by each head H and it will then drop to its horizontal position after each head H has moved out of contact with said latch 62.

Before the operator switches off the motors M and Ma, he moves the lever 59 to the broken-line position shown in Fig. 7, thus moving the latch 45 to the broken-line position shown in Fig. 8. As each head H enters the intersection between grooves G and 32, it will be prevented from reentering groove G and said head H will continue to move in horizontal groove 32. The latch 62 will prevent the heads H from moving back into the groove G.

Therefore, the heads H will be held at their highest positions by means of the groove 32 and the cars C will be brought to their normal lowest positions, illustrated in broken lines in Fig. 1.

Therefore, when the turning of the shaft 12 is stopped, the cars can be conveniently unloaded and reloaded, because said cars will then be in the broken-line position shown in Fig. 1.

While the apparatus is turning, the cars can be caused to move up and down in any manner, in addition to their rotary movement, and the cars can also turn relative to the respective spider arms so as to provide any desired combination of movements.

In its broadest aspect, the invention is pioneer in that it is the first to provide means whereby cars which are caused to turn about a vertical axis, and also to move up and down, can be brought to a normal low level before the operation of the amusement device is stopped.

The mechanical parts which have been described by way of illustration can be greatly varied without departing from the spirit of the invention and it would not be departing from the spirit of the invention to use pneumatic or electrical controls instead of the mechanical controls which are preferred because of their simplicity and durability. The axis of the shaft 12 need not be truly vertical.

For convenience in defining the invention in the claims, it may be stated that each of the carriers C moves in a path whose component in a horizontal plane is a closed curve and each said carrier is moved up and down relative to said closed curve so that the movement of the carrier has vertical components in addition to said horizontal component. The control means are operative to stop the vertical movement, while permitting the carriers to move along said closed curve.

In its best form, the groove 32 is truly horizontal but it would not be departing from the invention if the respective carriers C were not all at the same level when the movement of the apparatus is stopped, as long as the passengers can conveniently step out of the carriers C or enter said carriers.

In effect, the ring 37 is supported on the arm 34, since the collar 36 is merely a convenient intermediate part between the arm 34 and the ring 37.

The device would be operative if the cam 29 were maintained stationary while the shaft 12 was turned, and it would not be departing from the invention if the cam 29 were thus held stationary, during the operation of the device. The turning movement of the cam 29 relative to the shaft 12, is for the purpose of producing a more rapid up-and-down movement of the cars C, in their respective vertical planes.

I claim:

1. In combination, a hollow cam member, a shaft extending through said cam member, said cam member and said shaft being mounted so as to be turnable relative to each other, supporting means connected to said shaft and turnable in unison with said shaft, arms pivotally connected to said supporting means, carriers connected to said arms, said cam member having a first groove and a second groove which intersect each other, said arms having heads which are shaped to enter said grooves, the first control groove being shaped to rock the arms relative to the supporting means during the turning of the shaft, the second groove being shaped to hold the arms substantially stationary relative to the supporting means and to hold the carriers substantially at their lowest level while the shaft is being turned, and control means adapted to maintain said heads in the second groove, mechanism adapted to turn said shaft and said cam member while giving them a relative turning movement.

2. In an amusement device comprising a hollow vertical shaft, a hollow cam through which said shaft extends, means supporting said cam and adapted to permit the cam to be turned relative to the shaft, said cam having a first groove and also having a second groove, the second groove being substantially horizontal, supporting means connected to the shaft, arms pivotally connected to said supporting means, said arms being turnable in respective vertical planes relative to said supporting means, carriers connected to said arms, said arms having heads which are shaped to move in either the first groove or in the second groove, said first groove intersecting said second groove at two spaced points of the first groove, a first one-way latch movably located adjacent the first point of intersection and movable relative to the hollow cam, a second latch located adjacent the second point of intersection, the second latch having a pin which is turnably connected to the hollow cam, a vertically movable rod located in said hollow shaft, a diametral arm located on said vertically movable rod and extending through said shaft and turnable in unison with said shaft, a ring supported by said diametral arm and turnable relative to said diametral arm, means connecting said ring to said hollow cam so that said ring and said hollow cam turn in unison, connecting mechanism between the ring and the pin of the latch and operative to rock said latch to one of said positions when the vertically movable rod is raised or lowered, means adapted to operate said vertically movable rod, mechanism operative to turn said shaft.

JOHN A. BAKER.